Sept. 10, 1940.   M. R. SCOTT ET AL   2,214,385

OPHTHALMIC LENS

Original Filed Oct. 9, 1935

MURRAY R. SCOTT
SCOTT STERLING
INVENTORS

BY
ATTORNEYS

Patented Sept. 10, 1940

2,214,385

UNITED STATES PATENT OFFICE 2,214,385

OPHTHALMIC LENS

Murray R. Scott, Rochester, and Scott Sterling, Irondequoit, N. Y., assignors to Bausch & Lomb Optical Company, Rochester, N. Y., a corporation of New York Application October 9, 1935, Serial No. 44,234
Renewed April 12, 1940

1 Claim. (Cl. 88—54)

The present invention relates to ophthalmic lenses and more particularly to multifocal ophthalmic lenses which are made by fusing together two or more pieces of glass of different refractive indices.

In the making of fused multifocal lenses, it is desirable to have the countersink curve as shallow as possible. This is true because deeply curved segments are difficult to fuse properly and also because such segments necessitate an increased thickness in the finished lens. A shallow countersink and thin segment are especially desirable in the modern multifocal lenses where the segment has at least one flat shoulder. Unless the segment is thin, this flat shoulder will be deep and will be disturbing to the wearer.

It is also desirable that the segment and the major blank have nearly equal reciprocal relative dispersions. This latter requirement is necessary if objectionable chromatic aberration is to be avoided.

Heretofore the design of fused, multifocal, ophthalmic lenses has been largely a matter of compromise. The segment could be made thin at the expense of the chromatic correction or the lens could be made achromatic but with a thick segment. In the case of strong segments, this compromise was almost always unsatisfactory because the segment would have to be very thick with a highly curved surface, or the chromatic correction would have to be ignored. Lenses having a segment with a flat shoulder were particularly troublesome because of the thickness of the shoulder.

One of the objects of the present invention is to provide an improved multifocal ophthalmic lens. Another object is to provide a fused, multifocal, ophthalmic lens having a relatively thin segment. A further object is to provide a chromatically corrected, fused, multifocal, ophthalmic lens having a thin segment. These and other objects and advantages reside in certain novel features of construction, arrangement and combination of parts as will hereinafter be more fully set forth and pointed out in the appended claim.

Referring to the drawing.

The major or distance portion of a fused multifocal lens is usually made of spectacle crown, a glass having an index of refraction of approximately 1.523 and a reciprocal relative dispersion or $\nu$ value of approximately 55. The segment was then made of a crown glass having an index of refraction of approximately 1.616 and a reciprocal relative dispersion or $\nu$ value of approximately 55 or of a flint glass having an index of refraction of about 1.66 and a reciprocal relative dispersion or $\nu$ value of about 33. It is obvious that the former glass would give good color correction but would necessitate a thick segment while the latter glass would give a thin segment but would give rise to a large amount of chromatic aberration.

In making the improved fused multifocal lens according to this invention, the major or distance portion is made from the aforementioned spectacle crown and the segment is made from a baryta flint glass having an index of refraction of from 1.69 to 1.62 and a reciprocal relative dispersion or $\nu$ value of from 39 to 52.

One suitable glass having an index of refraction of 1.66 and a reciprocal relative dispersion or $\nu$ value of 42.0 has the following composition:

|  | Per cent |
|---|---|
| $SiO_2$ | 32.0 |
| $K_2O$ | 3.0 |
| $PbO$ | 23.0 |
| $BaO$ | 30.0 |
| $B_2O_3$ | 4.5 |
| Fining agents | 1.0 |
| Stabilizers | 6.5 |

Fining agents are well known to those skilled in the art and antimony and arsenic oxides are known as fiuing agents. The silicon, lead, potassium, barium and boron oxides are used to obtain the desired optical properties and, as a glass of such high lead and barium content is unstable, other stabilizers are used. Zirconium, zinc and aluminum oxides are well known to those skilled in the art as suitable stabilizers. The particular fining agent used may be a single oxide or may be a combination of fining oxides and the same is true of the stabilizers.

The glass set forth above is of high enough index of refraction to permit the desired thin segment and the reciprocal relative dispersion or $\nu$ value is sufficiently high to maintain a satisfactory chromatic correction when used with spectacle crown. It is desirable to keep the lead content of the glass as low as possible because while the lead raises the index of refraction, it also lowers the reciprocal relative dispersion. By increasing the barium content, some of the lead can be omitted and the barium raises the index of refraction and at the same time raises the reciprocal relative dispersion.

Figure 1:
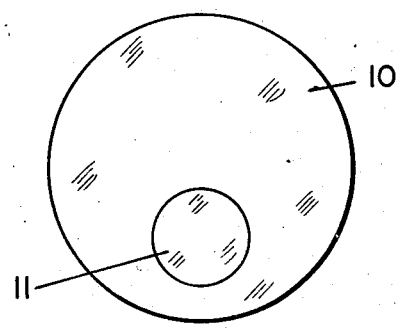
Fig. 1 is a front elevation of one type of lens embodying this invention.
Figure 2:
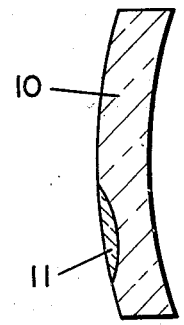
Fig. 2 is a vertical section thereof.

In the form of lens shown in Figs. 1 and 2, the major or distance portion 10 is made of spectacle crown having an index of refraction of 1.523 and a reciprocal relative dispersion or $\nu$ value of 55. The segment 11 is made of the baryta flint glass described above and has an index of refraction of 1.66 and a reciprocal relative dispersion or $\nu$ value of 42.0. The segment 11 will therefore be very thin and the chromatic correction quite satisfactory.

Figure 3:
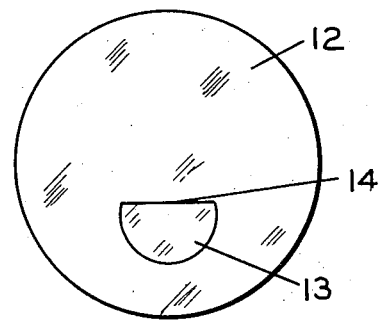
Fig. 3 is a front elevation of another type of lens embodying this invention.
Figure 4:
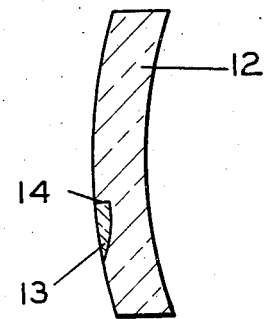
Fig. 4 is a vertical section of the lens of Fig. 3.

The lens shown in Figs. 3 and 4 has a major or distance portion 12 and a segment 13. This segment 13 has a flat top or shoulder 14. Here again the major portion 12 is made of spectacle crown. By making the segment of the baryta flint glass described above, the thickness of the segment 13 is reduced and the width of the shoulder 14 is reduced to a minimum. The high reciprocal relative dispersion of this glass at the same time maintains a satisfactory degree of chromatic correction.

From the foregoing it will be apparent that we are able to attain the objects of our invention and provide a chromatically corrected, fused, multifocal, ophthalmic lens. It is to be understood that the particular glasses mentioned above are described as examples and the invention is not limited to the specific glasses set forth. Various modifications can, of course, be made without departing from the spirit of our invention or the scope of the appended claim.

We claim:

An ophthalmic multifocal lens comprising a major member of glass and a minor member of glass fused thereto, said major member having a refractive index of approximately 1.52 and a reciprocal relative dispersion of approximately 55, said minor member having a refractive index of approximately 1.66 and a reciprocal relative dispersion of approximately 42, said minor member comprising approximately 23% of a lead compound and approximately 30% of a barium compound.

MURRAY R. SCOTT.
SCOTT STERLING.